Jan. 5, 1971      J. R. EDISON      3,551,940

BOX HINGE

Filed Aug. 19, 1968

INVENTOR
JACK R. EDISON
BY
ATTORNEY

United States Patent Office 3,551,940
Patented Jan. 5, 1971

3,551,940
BOX HINGE
Jack Roger Edison, Indianapolis, Ind., assignor to Eli Lilly and Company, Indianapolis, Ind., a corporation of Indiana
Filed Aug. 19, 1968, Ser. No. 753,603
Int. Cl. E05d 7/00
U.S. Cl. 16—150
3 Claims

ABSTRACT OF THE DISCLOSURE

A method for forming a hinge in plastic sheet material susceptible to formation by heat and pressure whereby two flush surfaces may be integrally hinged. The hinge is formed by conforming plastic sheet material into a pair of longitudinal valleys in a mold which are separated by a longitudinal ridge.

BACKGROUND OF THE INVENTION

In the container and packaging fields, production techniques frequently referred to as pressure forming, thermoforming and vacuum forming of plastic sheet material have been widely adopted. Usually, the plastic sheet material is from about 5 mils to 30 mils in thickness and is a vinyl, acetate or similar composition susceptible of being formed by applying heat and pressure forming or vacuum forming techniques. Numerous shapes of light weight containers can be formed in this manner. The plastic sheet material is relatively tough, flexible and semi-rigid. However, heretofore efforts to form integrally hinged covers and receptacles have been unsatisfactory.

In particular, hinges which are capable of flexing at least 180° have been proposed by employing cutout portions in a fold in the plastic sheet material. Although such cutouts along a creased portion of the material enhance the hinge's flexibility, the hinge is also weakened and is more susceptible to tearing. Hinges with a curved cross section have also been formed from plastic sheet material, thereby avoiding a sharp edge that is subjected to stress. However, these round type of hinges prevent the mating surfaces or edges of the box from staying flush with each other since the use of such a curved or rolled surface for the hinge causes bowing of the adjacent mating edges. This unwanted bowing can be partially avoided by providing a sharp crease in the sheet material to serve as a hinge. However, this type of arrangement when subjected to several flexing actions tends to break and tear.

SUMMARY OF INVENTION

Briefly, my invention comprises the forming of a hinge from plastic sheet material whereby the hinge has a pair of hollow and parallel quarter-round valleys which extend outwardly along the length of the hinge. Each of these quarter-round edges has a first side connected to one of the mating surfaces and has a second side connected to a like side of the other quarter-round edge, thereby forming a ridge surface which is parallel to the valleys. This unique configuration provides a hinge that is capable of withstanding many flexing operations extending over at least a 180° range. The three surfaces absorb the various forces resulting from flexing the hinge and prevent any tearing or unwanted strain on the hinge. In addition these three hinge surfaces cooperate to maintain the two mating surfaces of the container flush without any bowing effect.

Thus it is one object of this invention to provide a new and improved hinge formed from plastic sheet material. Another object of this invention is to provide a method for forming a hinge from plastic sheet material in accordance with conventional thermoforming techniques. Other objects and advantages of this invention will be apparent upon reading the following descriptions in connection with the drawing.

DETAILED DESCRIPTION OF INVENTION

Figure 1:
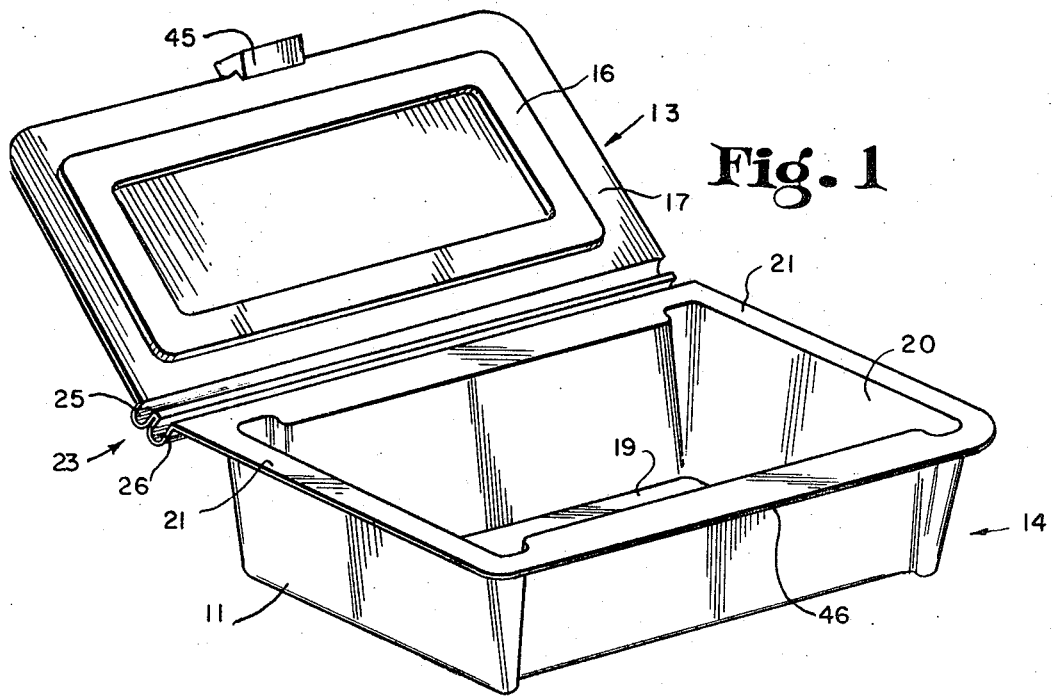
FIG. 1 is a perspective view of a box with the integral hinge of this invention.

Referring to the drawing, a container 11 is illustrated which in the particular embodiment comprises a rectangular box. Container 11 has a cover 13 and a base 14. Cover 13 has raised surface 16 which is surrounded by a flange 17. Base 14 has a bottom surface 19 surrounded by four walls 20 and a flange 21.

It is to be understood that the invention described herein is applicable to a variety of containers, receptacles and the like and is not restricted to the particular type container shown in the drawing. Cover 13 and base 14 are integrally joined by hinge 23. It is to be noted that this hinge is formed with a pair of hollow and parallel valleys 25 and 26 (FIG. 1) which extend outwardly along the length of the hinge. Each of these valleys has an arcuate cross section thereby avoiding a sharp creased effect. Valley 26 has a first side 28 (FIG. 4) which is connected to flange 21 on base 14. Likewise valley 25 has a first side 29 connected to flange 17 on cover 13. Valleys 25 and 26 each have a second side 31 and 32 respectively which cooperate to form a ridge 33 extending along the length of the two valleys. Thus hinge 23 comprises a pair of identical shaped quarter-round valleys which extend outwardly with a ridge therebetween.

Figure 2:
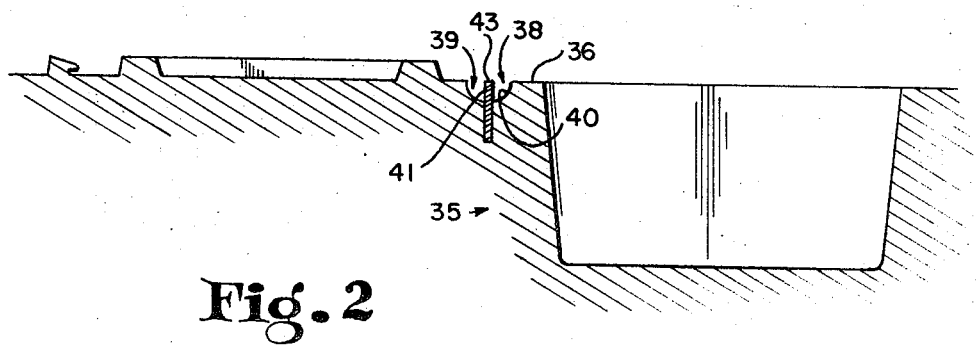
FIG. 2 is a partial view of a mold for forming the box and hinge of FIG. 1 taken in cross section on a line transversing the cover and box mold elements.

In forming the hinge of this invention by conventional thermoforming techniques, a mold 35 is used which has a flat surface 36 (FIG. 2). Formed into the flat surface of this mold are a pair of parallel recesses 38 and 39 which will form the two quarter-round valleys 25 and 26 of the hinge. Each recess may have an arcuate surface 40 and a flat surface 41 meeting on a sharp junction line. Positioned between these two recesses is an upwardly extending longitudinal ridge which in the preferred embodiment is a creasing rule die 43 that forms the longitudinal ridge 33 (FIG. 4) of the hinge. The height of the rule die should not exceed the depth of the recesses 38 and 39 and is preferably even with the mold's surface 36. Its width is preferably less than the radius for arcuate surface 40. The remaining configurations on the mold surface will depend on the particular design used for forming the integral cover and base.

Thus it can be seen that the integrally connected cover and base of the receptacle are formed in substantially one primary horizontal plane. This forming occurs by placing a flat sheet of plastic material of the desired thickness over the flat surface 36 of the mold. During the application of heat and pressure and/or vacuum, the flat sheet material is deformed to assume the configuration comprising the recesses and ridges in the mold surface.

Figure 4:
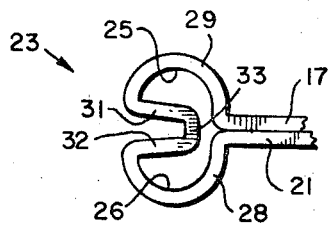
FIG. 4 is an end view of the hinge when its associated cover and bottom are closed.
Figure 3:
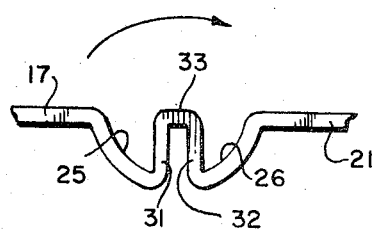
FIG. 3 is an end view of the hinge of this invention as it appears when removed from the mold.

After the sheet material has been accordingly formed and cooled, it may be removed from the mold surface. The formed sheet material may now be immediately folded along its hinged portion with the outer or top surfaces of flanges 17 and 21 doubled onto each other to assume the inner surfaces of the container. This folding action results in the quarter-round valleys 25 and 26 extending outwardly with the ridge surface 33 extending inwardly. When the receptacle is closed the hinge assumes an appearance in cross section of a Y or a wishbone (FIG. 4). In this folded position the corners of ridge 33 are partially rounded out and have the effect of biased levering elements which assist in keeping the flanges 17 and 21 adjacent to each other, including those areas continguous to hinge 23.

Thus a light weight container has been formed which requires no significant assembly time in view of its integral construction. The container has a hinge which will last the normal expected life of the container without tearing. The mating surfaces of the cover and base are flush to each other and can be kept in this position by any of a number of means such as the use of undercut corners or a built in snap fastener 45 (FIG. 1) in cover 13. It is apparent that the precise dimensions of the valleys and ridge of hinge 23 will vary depending on the thickness of the sheet material and the size of the container.

Although only one embodiment of this invention has been illustrated and described, it will be apparent to those with skill in the art that modifications can be made without departing from the spirit of the invention and the scope of the appended claims.

I claim:

1. A hinge integrally joining a pair of flush surfaces formed from a plastic sheet material deformable by heat and pressure comprising a pair of substantially identical hollow and parallel valleys of uniform thickness outwardly extending along substantially the length of said hinge, each of said valleys having a first side connected to one of said surfaces and its opposite side connected to a like side of said other valley and forming a ridge parallel to said valleys, said valleys being of quarter round configuration when said surfaces are spread approximately 180 degrees and said valleys extending outwardly from said flush surfaces with said ridge extending inwardly when said surfaces are folded upon each other.

2. A hinge according to claim 1 in which the height of said ridge is no greater than the depth of said valleys.

3. A hinge according to claim 2 in which the width of said ridge is less than the radius for said valleys.

References Cited

UNITED STATES PATENTS

| | | | |
|---|---|---|---|
| 1,708,456 | 4/1929 | Tunick | 229—2.5 |
| 2,515,113 | 7/1950 | Chaplin | 220—31SR |

BOBBY R. GAY, Primary Examiner

D. L. TROUTMAN, Assistant Examiner

U.S. Cl. X.R.

220—31